Nov. 14, 1950     F. J. RAYBOULD     2,529,572
CARBURETOR VALVE
Filed Jan. 15, 1946     2 Sheets-Sheet 1
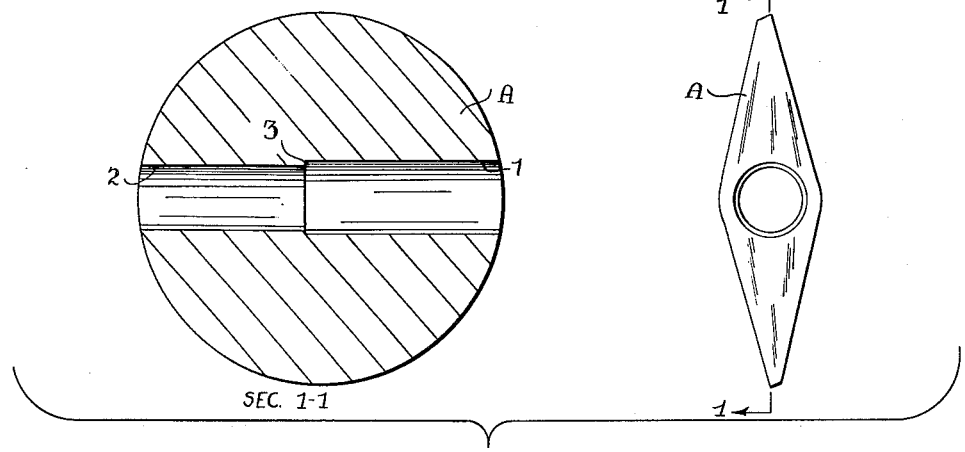
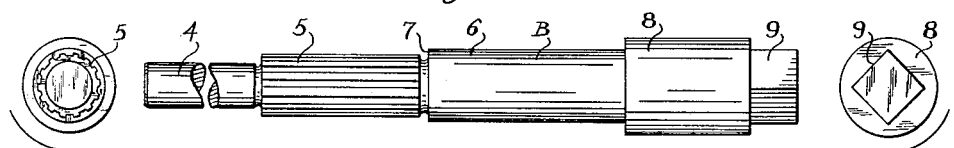
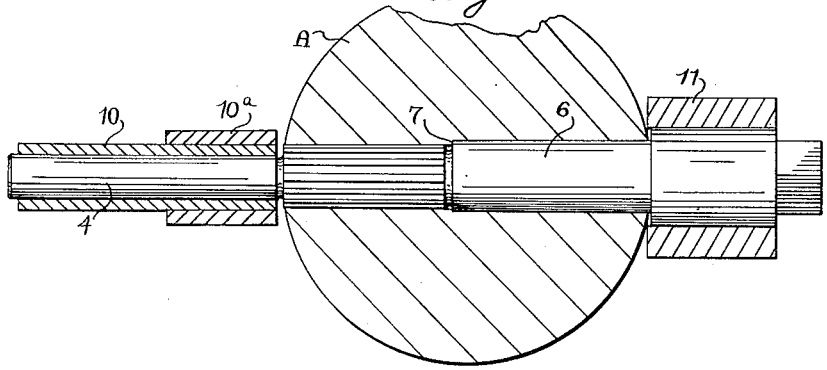
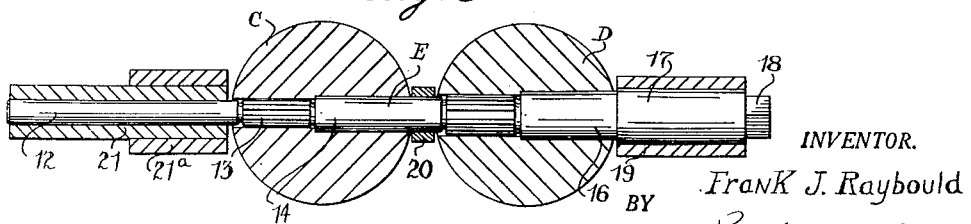
INVENTOR.
Frank J. Raybould
BY Richey & Watts
ATTORNEYS Nov. 14, 1950 — F. J. RAYBOULD — 2,529,572
CARBURETOR VALVE
Filed Jan. 15, 1946 — 2 Sheets-Sheet 2

INVENTOR.
Frank J. Raybould
BY
ATTORNEYS

Patented Nov. 14, 1950

2,529,572

UNITED STATES PATENT OFFICE 2,529,572

CARBURETOR VALVE

Frank J. Raybould, Lakewood, Ohio, assignor to The Weatherhead Company, Cleveland, Ohio, a corporation of Ohio Application January 15, 1946, Serial No. 641,232

4 Claims. (Cl. 251—11)

This invention relates to a valve structure commonly referred to as a butterfly valve, which structure is widely employed to serve as a throttle valve in internal combustion engines. More particularly this invention relates to improvements in the method of assembling a butterfly valve, along with the valve operating shaft in the conduit or carburetor with which it works.

Prior valves of the type to which this invention relates have commonly comprised a slotted shaft member, which member was first inserted through apertures in the conduit or carburetor device. The butterfly valve itself was then inserted in the slot in the shaft, and was fastened to the shaft by means of screws threaded into the shaft. This construction has many undesirable features.

First, the slotting of the shaft required a relatively expensive milling operation, and furthermore, the slot seriously weakened the shaft itself. Next, the assembly of the valve with the shaft was a slow and relatively costly operation. The screw holes had to be aligned, and the small screws entered and tightened. This was difficult because these valves are often well within the conduit making them inaccessible for delicate assembly operations. In addition, the devices of the prior art were difficult to disassemble. It appears that the constant flow of vaporized fuel or other gases about the valve caused the screws to seize in the shaft, the result being that it was often necessary to destroy the parts before they could be removed.

It is an object of this invention to provide a valve which is not subject to the deficiencies of those found in the prior art. The valve of this invention includes a shaft which requires no expensive and weakening milling operation. The valve is assembled in its housing by one simple pressing operation, and it can be as readily disassembled. No delicate screws are required which are difficult to insert and which tend to freeze in place.

Other objects and advantages of my invention will appear in the following description which considered in connection with the accompanying drawings sets forth several preferred embodiments of the invention.

Fig. 1 shows the valve disc for one embodiment of the invention.

Fig. 2 shows the valve operating shaft for the disc shown in Fig. 1.

Fig. 3 shows the shaft and disc assembled.

Fig. 4 illustrates an embodiment similar to that of the previous figures, arranged to work in dual conduits.

Figure 5:
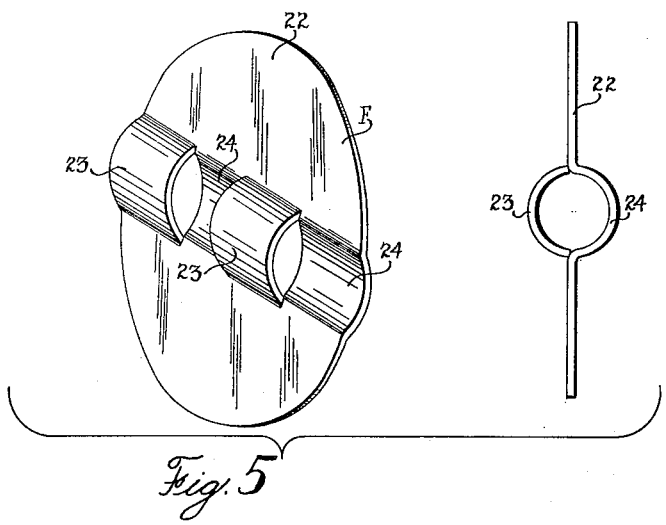

Fig. 5 discloses valve disc made in accordance with a second embodiment.

Figure 6:
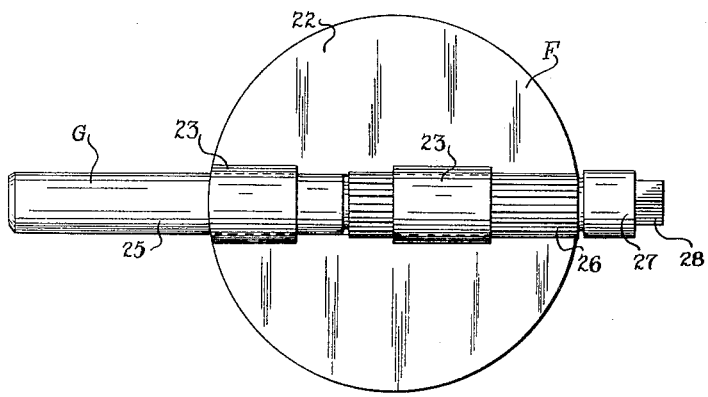

Fig. 6 shows the assembled disc and shaft.

Figure 7:
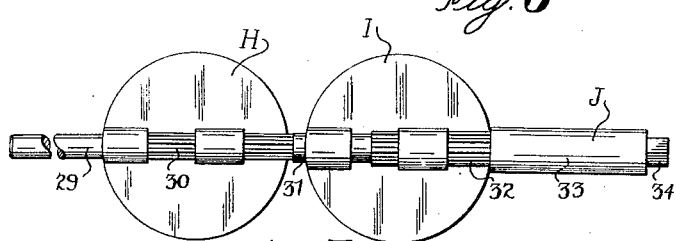
Figure 8:
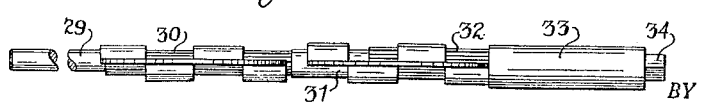

Figs. 7 and 8 show the method of assembling a dual valve with the second embodiment.

Fig. 1 shows a sectional view 1—1 and a side view of the valve member A which represents one embodiment of my invention. The valve body may be formed of moulded plastic, hard rubber, soft brass or bronze or any other relatively rigid yet deformable material. The valve body has a central apertured portion of two diameters. There is provided a bore 1 of one diameter, a second smaller bore 2 of smaller diameter. A shoulder 3 is formed where the bores meet.

The operating shaft B, shown in Fig. 2 is a metal part formed with several diameters. From left to right can be seen a long cylindrical terminal bearing portion 4; a longitudinally splined portion 5 of slightly larger basic diameter than portion 4; a second cylindrical portion 6 which is slightly larger in diameter than the outside diameter of splined portion 5; a second bearing portion 8 at least as large as portion 6; and a squared operating portion 9.

The splined portion 5 of the shaft and the bore 2 of the valve are so proportioned that a snug driving fit is obtained when the shaft is driven into the valve as shown in Fig. 3. Likewise cylindrical portion 6 of the shaft fits with bore 1 of the valve, to act as a locating means. Bushing 10 and supporting bearings 10a and 11, Fig. 3 support the assembled valve for rotation. Parts 10a and 11 may be separate bushings or part of the conduit or carburetor body.

It can be seen from Fig. 3 that the assembly of the valve in this invention is simple and rapid. The valve disc A need only be held partially aligned with the supports 10a and 11. Shaft B may be readily inserted through support 11, and the long end portion 4 will extend through the smaller part 2 of valve A and also through the aperture in the other support 10a. Thus end portion 4 acts as a pilot for initially assembling the parts, and since bushing 10 has not yet been inserted, the opening there is amply large and the initial step of the assembly is readily effected.

Assembly is completed by pressing the shaft B into the valve body A, until shoulder 7 engages shoulder 3 in the valve, whereupon the splines tightly grip the valve body. Bushing 10 may then be slipped into place, aligning the valve with the conduit or carburetor.

Of course bushing 10 need not be separate from support 10a. In this case slightly more care would be exercised in the insertion of pilot 4 in its support. It will also be clear to those skilled in the art that valve body A may include an insert to receive the shaft B, the provision of such an insert being a common expedient.

The modification shown in Fig. 4 is an adaptation of the valve arrangement described previously, for use in dual conduits or carburetors. In this form valve discs C and D are provided, similar to valve disc A of Fig. 3. However, the diameter of the larger bore in disc C is no larger than the diameter of the smaller bore in valve disc D, in this modification. A shaft E is provided in this form which has two sets of splined and cylindrical portions. Starting at the left, there is a relatively long pilot portion 12 which also acts as a bearing portion. A splined portion 13 is provided the outside diameter of which is greater than that of portion 12. A cylindrical guide portion 14 is provided, which must have a diameter at least as large as that of splined portion 13. Splined portion 15 must be slightly larger in outside diameter than portion 14, and cylindrical portion 16 must be at least as large in diameter as is splined portion 15. Finally, cylindrical bearing portion 17 and the squared driving end 18 are shown.

During assembly, shaft E is first inserted in the larger support 19, next it is inserted in valve D which is held in place in the chamber, next the shaft enters central support 20, then it enters valve C and finally it is positioned in the smaller support 21a. As in the previous modification, the long pilot 12 will enter the smaller support 21a before the shaft is driven home, thus providing initial support and alignment. After the shaft is pressed into the valves C and C, aligning bushing 21 is slipped into place completing alignment of the assembly. As mentioned before, aligning bushing 21 could be made integral with its support 21a.

Although the drawings illustrate certain proportions, lengths and relative diameters, these can be varied without affecting the basic invention. Basically, the parts should be proportioned so that the splined part of the shaft will not seriously mutilate that part of the valve which is eventually engaged by the cylindrical part. Likewise, where cylindrical parts of the shaft must be passed through bores to be engaged by splined parts of the shaft, the cylindrical parts should not remove enough material from the valve disc to cause it to fit the splined part loosely. The squared end of the shaft is merely representative of a large class of operating means and the present invention is not limited to any particular operating arrangement.

The advantages of ease of assembly and disassembly and simplicity of manufacture described in conjunction with the first modification are also present in the dual form described in connection with Fig. 4.

Figs. 5 and 6 illustrate another form of valve disc designed to carry out the objects of my invention. The valve disc F comprises a sheet metal body 1 from which are pressed alternately extending arcuate portions 23 and 24. The arcuate portions are semicircular so that they cooperate to provide a circular aperture to receive the shaft G. Fig. 6 shows the assembly of a single valve unit. Pilot portion 25 of shaft G is cylindrical and of approximately the same diameter as that of the effective aperture provided by the cooperation of arcuate portions 23 and 24 of valve 22. The splined portion 26 of shaft G has an outside diameter somewhat larger than the effective valve aperture so that it will grip and retain the valve when pressed into place. Outer bearing 27 and drive part 28 complete the shaft. The method of assembly with the conduit or carburetor is like that described in connection with Fig. 3 and need not be repeated here.

Figs. 7 and 8 show a modification whereby dual valves may be produced using the type of valve shown in Fig. 5. Two valve discs H and I are provided, the pressed out portions of valve H providing an effective aperture of smaller diameter than that provided by similar pressed out portions in valve I. Shaft J is formed to retain the discs in the conduit or carburetor. This shaft has a smaller end bearing and pilot member 29, and a smaller splined portion 30 which is forced into the aperture formed by the pressed out portions in valve H. A larger pilot portion 31 on the shaft is of about the same diameter as the effective aperture in valve I, and the splined portion 32 of shaft J is made to provide a snug fit with valve I. Bearing portion 33 and drive end 34 complete the shaft.

The method of assembly of the form shown in Fig. 8 is like that described in conjunction with Fig. 4, so it need not be repeated here. Likewise, the remarks made previously concerning the body of the carburetor and the bushings apply to the form shown in Figs. 7 and 8.

The dimensions and relative proportions shown in Figs. 5-8 inclusive are for illustration only and may be modified slightly without departing from the spirit of the invention.

Having completed the description of my invention it can be seen how my valve assembly attains its objects and overcomes the objections attributable to the prior art. All parts, both valves and shafts can be made by simple machining operations. The shafts, for example, need not be milled to receive the valve, nor need it be drilled and tapped. Simple turning and broaching operations are all that are required. Assembly of the parts can be done rapidly by relatively inexperienced personnel, and no small screws are required, which tend to freeze in place, and which are readily lost or dropped during assembly. Furthermore, a very rigid and positive connection is effected between shaft and valve, which connection cannot work loose during use.

Having thus described the present invention so that others skilled in the art may be able to understand and practice the same, I state that what I desire to secure by Letters Patent is defined in what is claimed.

What is claimed is:

1. A valve assembly comprising a shaft having a splined portion and a cylindrical portion, the outside diameter of the splined portion being larger than the diameter of the cylindrical portion, a disc like valve member having a plurality of integral diametrically disposed outwardly extending substantially semi-cylindrical portions, said portions extending in alternately opposite directions, said semi-cylindrical portions engaging the cylindrical portion of the shaft and firmly gripping the splined portion of the shaft, and terminal bearing and supporting means on said shaft.

2. A valve assembly comprising a shaft having a splined portion and a cylindrical portion, the outside diameter of the splined portion being larger than the diameter of the cylindrical portion, a disc like valve member having a plurality of integral diametrically disposed outwardly extending substantially semicylindrical portions, said portions extending in alternately opposite directions, said semi-cylindrical portions engaging the cylindrical portion of the shaft and firmly gripping the splined portion of the shaft, and terminal bearing and supporting means on said shaft, said terminal bearing means including a cylindrical member longer than said splined portion to act as a pilot during the assembly operation.

3. A valve assembly comprising a disc-like valve member having shaft receiving portions the axes of which are substantially parallel to the disc, a valve support and operating shaft, said shaft being fitted into said valve member and having a non-circular portion and a cylindrical portion, the diameter of the cylindrical portion being different from the outside diameter of said non-circular portion whereby shoulder means are formed adjacent the junction of said portions, the radius of one of the shaft receiving portions of said valve member being such that it is deformed by the non-circular portion of said shaft, and the radius of the other of the shaft receiving portions of said valve member being substantially equal to that of the cylindrical portion of said shaft.

4. A valve assembly comprising a disc-like valve member having shaft receiving portions the axes of which are substantially parallel to the disc, a valve supporting and operating shaft, said shaft being fitted into said valve member and having a non-circular portion and a cylindrical portion, the diameter of the cylindrical portion being different from the outside diameter of said non-circular portion whereby shoulder means are formed adjacent the junction of said portions, the radius of one of the shaft receiving portions of said valve member being such that it is deformed by the non-circular portion of said shaft, and the radius of the other of the shaft receiving portions of said valve member being substantially equal to that of the cylindrical portion of said shaft, terminal bearing and supporting means integral with said shaft, said terminal bearing means including a cylindrical member longer than said non-circular portion to act as a pilot during the assembly operation.

FRANK J. RAYBOULD.

REFERENCES CITED

The following references are of record in the file of this patent:

UNITED STATES PATENTS

| Number | Name | Date |
|---|---|---|
| 986,754 | Podhajsky | Mar. 14, 1911 |
| 1,328,565 | Howard | Jan. 20, 1920 |
| 1,402,824 | Wood | Jan. 10, 1922 |
| 1,654,550 | Muend | Jan. 3, 1938 |
| 2,327,599 | Hufford | Aug. 24, 1943 |